Nov. 29, 1938.    D. BECQUET    2,138,334
WASHING MACHINE
Filed Aug. 24, 1935
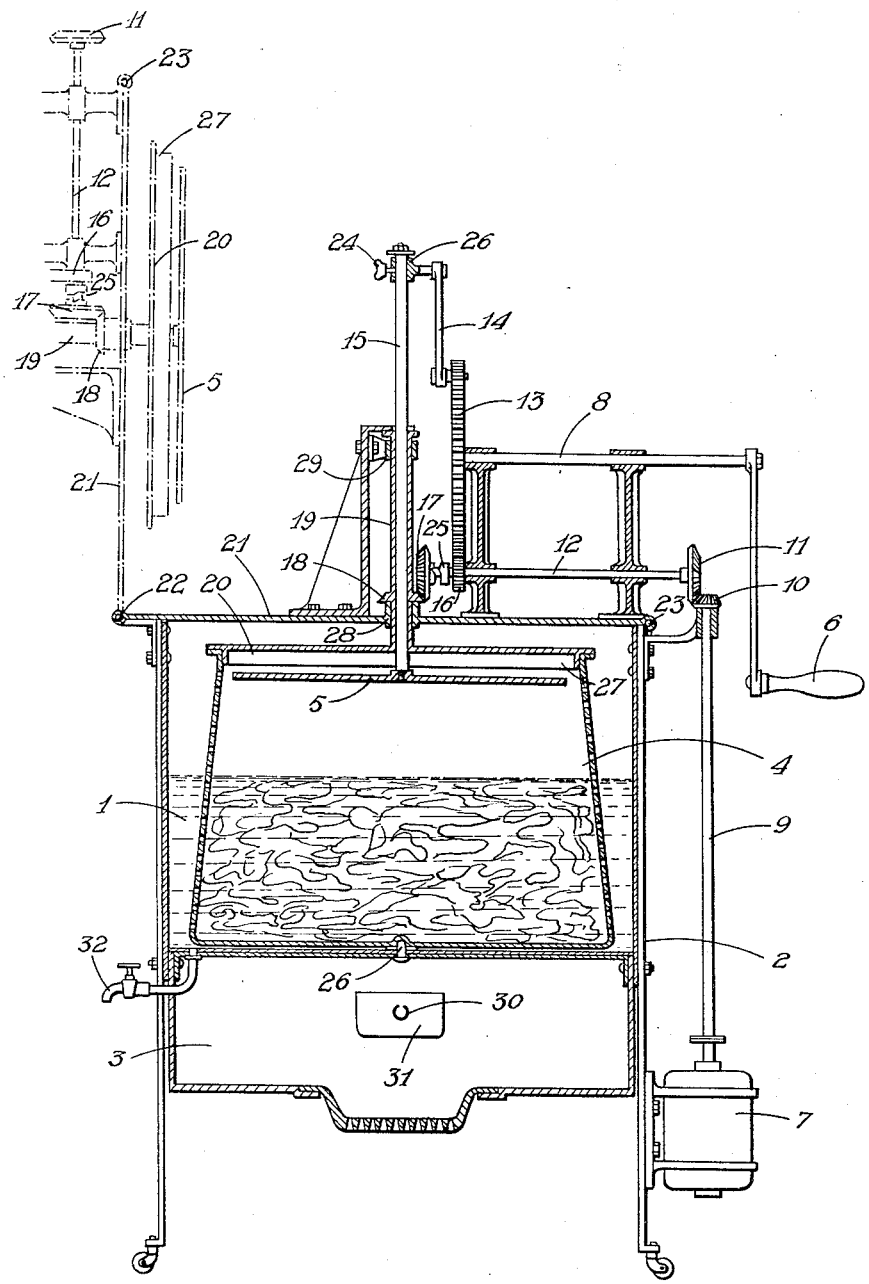
INVENTOR
DENISE BECQUET
BY Haseltine, Lake & Co
ATTORNEYS Patented Nov. 29, 1938

2,138,334

UNITED STATES PATENT OFFICE 2,138,334

WASHING MACHINE

Denise Becquet, Brussels, Belgium, assignor to Dr. Ing. Roberto Parrilli, Milan, Italy Application August 24, 1935, Serial No. 37,639
In Belgium September 4, 1934

3 Claims. (Cl. 68—23)

The present invention relates to domestic laundry machines of the type comprising a reciprocating washing member or agitator and a rotating perforated container, both mounted coaxially within the laundry casing. The invention has for its object to provide a washing machine of this type, in which easy access can be had to the inside of the container, said machine furthermore being simple in construction, efficient in operation and adapted successively to perform the operations of soaking, boiling, washing, rinsing, azuring and extracting, without having to remove the laundry from the container.

The machine according to my invention, in addition to a stationary casing having a crossbar or lid pivoted thereto and a reciprocating washing member, comprises a rotary extracting container and is characterized by the fact that the cross-bar or lid carries a mechanism adapted to operate the washing member and the extracting container, either simultaneously or separately, at will.

Another important feature of the invention consists in that the cover of the extracting container forms a coupling and centering member for said container, and is also supported by the cross-bar of the laundry casing.

These, and further features are described in detail hereunder with reference to the accompanying drawing which illustrates, by way of example, a washing-machine according to the invention in axial section.

The stationary laundry casing 1 of the machine is supported on a frame 2 above a burner or fire box 3 and it contains a perforated rotary extracting container 4, inside which a reciprocating agitator plate or beater 5 moves up and down, said agitator being shown in its raised position in the drawing. As illustrated the agitator plate or beater 5 has a flat under surface and its diameter preferably is only slightly smaller than the diameter of the container 4.

The extracting container 4 and the agitator plate 5 may be driven by hand through handle 6 or from a power supply by means of electric motor 7 secured to the lower portion of the frame 2. The handle and the motor each are adapted to drive the common control gearing of the extracting container and of the agitator, i. e. the handle through horizontal shaft 8 and the motor through vertical shaft 9, bevel gears 10, 11 and horizontal shaft 12. The parallel shafts 8 and 12 carry two constantly meshing gear wheels 13 and 16, the wheel 13 being of large diameter and connected with the operating stem 15 of agitator 5 by means of a crank pin and connecting rod 14, whilst the other wheel 16, of small diameter, is secured onto shaft 12. A bevel gear 17 on the end of said shaft 12 meshes constantly with bevel gear 18 secured on a tubular shaft 19 which surrounds the stem 15 and carries the cover 20 of the extracting container.

The entire driving mechanism is mounted above the laundry casing 1 and supported on a cross bar 21 pivotally connected at one of its ends 22 to the frame 2 and adapted to be secured at its other end by means of a lock-bolt 23. I am thereby enabled to open up entirely the top portion of the laundry casing by merely lifting the entire driving mechanism together with cross bar 21, and causing same to rock around pivot 22 as illustrated in dot and dash lines on the drawing, when it is desired to insert or to remove laundry.

If required, the cross bar 21 may be formed as a cover-plate covering the entire surface of casing 1. Such an arrangement is not necessary however, because the greater portion of the upper surface of the laundry casing 1 is closed by the cover 20 of the perforated container, said cover being also raised together with cross bar 21 and agitator 5 when it is desired to reach the interior of perforated container 4. The upward movement of cross bar 21 also uncouples the electric motor 7 from the driving mechanism by separating bevel gears 10, 11 from one another, thereby removing the risk of undesired operation of the machine when the casing is opened.

When cross bar 21 is lowered onto the casing, bevel gears 10 and 11 again come into mesh, cover 20 caps the perforated extracting container 4 and the machine is ready for operation. In order to wash the laundry by means of the agitator or beater 5, I couple the stem 15 of said agitator with the driving mechanism by means of a clamping screw 24, whilst the extracting container is uncoupled by opening the dog-clutch 25 thereby loosening bevel wheel 17 on shaft 12. The upper portion of the path of reciprocating agitator or beater 5 driven through the handle or the motor is above the predetermined water level in casing 1, so that the said agitator beats vigorously on the laundry and at the same time acts like a piston inside container 4, that is to say produces alternate forcing and suction of the water through the laundry and the wall of the container, into and out of the annular space between the side walls of the container and of the casing 1. The combined beating and pumping action is very efficient and rapidly washes the laundry.

To carry out the extracting operation, the plunger stem 15 is uncoupled by loosening the clamping screw 24 so that the sleeve 26 on the connecting rod's cross head reciprocates freely on rod 15 without moving same; the dog clutch 25 is then closed. The extracting container thus is driven from shaft 12, through bevel wheels 17 and 18, tubular shaft 19 and cover 20, the latter acting simultaneously as a coupling and as a centering member for the extracting container. When cross bar 21 is raised together with cover 20 so as to open up the casing, the rotating container is completely uncoupled and rocks slightly about pivot 26, inclining towards the more heavily loaded side, the edge of the container then resting on the bottom of casing 1, thereby enabling the operator to appreciate an uneven distribution of the laundry and to correct the arrangement thereof within said container in order to avoid vibrations of the machine at high speeds of rotation. As shown the diameter of the container 5 is greater than its height so that it has a low lying centre of gravity, its side walls preferably flaring downwardly. When the cross bar 21 is lowered, the cover 20 is applied onto the container 4, said cover being preferably formed with a ledge 27 which fits accurately in the opening of the container, provides a satisfactory driving engagement and automatically centers the container with respect to the tubular shaft 19. Said tubular shaft is firmly maintained in bearing 28 on cross bar 21 and in bearing 29 on a bracket secured to the cross bar.

The fire box 3 situated under casing 1 and adapted to burn coals or wood for heating and boiling the laundry, may also be gas-heated. For this purpose the box 3 contains a gas heater 30 (shown in cross section on the drawing) which is advantageously mounted on the door 31 of the fire box.

The casing 1 can be emptied by means of a cock 32 communicating with an outlet at the bottom of said casing.

It is clear that the machine described although of simple construction, may carry out all laundering operations with great facility, and may easily be hand or motor driven with similar satisfactory results, owing to the control gear mechanism which reduces or increases the transmission ratio, as required.

The invention is obviously not limited to the details of execution shown merely by way of example and modifications may be made without departing from the scope of my invention as defined by the appended claims.

I claim:

1. In a washing machine, the combination of a laundry casing, a pivot centrally located on the bottom of said casing, a hollow rotatable extracting container loosely supported on said pivot, the transverse diameter of said container being larger than its vertical height, said pivot supporting the center of the bottom of the container spaced from the bottom of the casing, said container having a downwardly flaring shape and being adapted to rest in idle position with a portion of its lower edge on the bottom of said casing when not in rotation, means for centering and rotating said container, a flat reciprocating pounder, and means for reciprocating said pounder.

2. In a washing machine, the combination of a laundry casing, a hollow rotary extracting container located in said casing, a flat pounder adapted to be reciprocated in said container, said container having a low lying center of gravity and being loosely supported at the center of its bottom and adapted to rest in inclined idle position with a portion of its bottom edge upon the bottom of said casing, means for centering said container in vertical position, said means comprising a cover movably supported on said casing so that it may be lowered into registering engagement with the upper edge of said container, means for rotating said cover, and means coaxial with said centering means for reciprocating said pounder within said container.

3. In a washing machine, the combination of a laundry casing, a hollow rotary extracting container located in said casing, said container having a transverse diameter larger than its vertical height, a pivot projecting centrally upward from the bottom of said casing, the bottom of said container having a recess loosely engaging said pivot, said container being adapted to tilt sidewise in idle position about said pivot and resting with a portion of its lower edge upon the bottom of said casing, means for centering said container on said pivot, said means being adapted to fit and register with the upper edge of said container, means for rotating said centering means, a flat pounder mounted for reciprocation in said container, and means coaxial with said centering means for reciprocating said pounder.

DENISE BECQUET.